US012200427B1

(12) United States Patent
Dang

(10) Patent No.: US 12,200,427 B1
(45) Date of Patent: Jan. 14, 2025

(54) AUDIO CABLE WITH SWITCHABLE TRANSMISSION DIRECTION

(71) Applicant: J & D Tech Inc, Nesconset, NY (US)

(72) Inventor: Rong Dang, Shenzhen (CN)

(73) Assignee: J & D Tech Inc, Nesconset, NY (US)

( * ) Notice: Subject to any disclaimer, the term of this patent is extended or adjusted under 35 U.S.C. 154(b) by 0 days.

(21) Appl. No.: 18/779,236

(22) Filed: Jul. 22, 2024

(51) Int. Cl.
*H02B 1/00* (2006.01)
*H04R 1/10* (2006.01)

(52) U.S. Cl.
CPC ......... *H04R 1/1041* (2013.01); *H04R 1/1033* (2013.01); *H04R 2420/09* (2013.01); *H04R 2499/11* (2013.01); *H04R 2499/15* (2013.01)

(58) Field of Classification Search
CPC ............................ H04R 1/1041; H04R 1/1033
See application file for complete search history.

(56) References Cited

U.S. PATENT DOCUMENTS

| | | | | |
|---|---|---|---|---|
| 6,762,675 | B1 * | 7/2004 | Cafiero | H04L 49/40 379/22.01 |
| 7,910,833 | B2 * | 3/2011 | McGinley | H01R 13/70 |
| 9,748,910 | B1 * | 8/2017 | Wickersham | H04R 3/04 |
| 11,159,785 | B1 * | 10/2021 | Lin | H04N 21/43635 |
| 2002/0029090 | A1 * | 3/2002 | Pierre Bertin | H04N 21/436 348/E7.07 |
| 2007/0218962 | A1 * | 9/2007 | Tsai | H04R 1/1033 455/575.2 |
| 2011/0093628 | A1 * | 4/2011 | Bulgin | G06F 5/14 710/56 |
| 2017/0195770 | A1 * | 7/2017 | Cheney | H04R 1/1016 |
| 2018/0091771 | A1 * | 3/2018 | Hart | H04N 7/104 |
| 2018/0249123 | A1 * | 8/2018 | Mcardell | H04L 65/1069 |
| 2019/0305812 | A1 * | 10/2019 | Kolsrud | H04B 17/318 |
| 2020/0014472 | A1 * | 1/2020 | El-Hassan | H04B 17/0085 |
| 2022/0417683 | A1 * | 12/2022 | Braband | H04R 25/652 |

* cited by examiner

*Primary Examiner* — Simon King
(74) *Attorney, Agent, or Firm* — Olive Law Group, PLLC

(57) ABSTRACT

An audio cable with switchable transmission direction, includes an audio cable line. One end of the audio cable line is provided with a first interface for connecting with an audio device, and other end of the audio cable line is provided with a second interface for connecting with a terminal device. A switch module is arranged at a middle part of the audio cable line. The switch module is electrically connected with the first interface and the second interface. When the switch module is located at a first position, the audio cable line features a function of inputting audio signals from an audio device to a terminal device; when the switch module is located at a second position, the audio cable line features a function of outputting the audio signals from the terminal device to the audio device.

13 Claims, 10 Drawing Sheets

AUDIO CABLE WITH SWITCHABLE TRANSMISSION DIRECTION

TECHNICAL FIELD

The present invention relates to a technical field of audio cable, in particular to an audio cable with switchable transmission direction

BACKGROUND

The audio cable is an interface cable used for connecting computers with audio devices, supporting high-definition digital audio transmission, with the advantages of plug-and-play, stable digital signal transmission, etc. It can send audio signals from a computer to speakers, headphones or other audio devices.

However, it should be noted that a single audio cable can usually only realize input or output function, because the interface of the audio cable is usually one-way communication. It either sends audio signals from the computer to the external device (output) or receives audio signals from the external device to the computer (input), and cannot meet the needs of input and output at the same time.

Users usually prepare two different audio cables, one of which is used for inputting the audio signals of the external device to the computer, and the other is used for outputting the audio signals of the computer to the external device. Users need to choose the corresponding audio cable according to different usage scenarios. However, the appearance of the two audio cables is roughly the same, and junior music workers may find it difficult to distinguish them, and make the wrong purchase. The wrong choice not only increases the cost, but also fails to meet their usage needs, thus affecting the user experience.

SUMMARY

In order to overcome the shortcomings of the prior art, the present invention provides an audio cable with switchable transmission direction. The audio cable has functions of audio input and audio output. Users only need to use one audio cable to adapt to different usage scenarios, which saves costs and improves the user experience.

The technical solution adopted by the present invention to solve the technical problem is:

An audio cable with switchable transmission direction, including an audio cable line. One end of the audio cable line is provided with a first interface for connecting with an audio device, and other end of the audio cable line is provided with a second interface for connecting with a terminal device. A switch module is arranged at a middle part of the audio cable line. The switch module is electrically connected with the first interface and the second interface. When the switch module is located at a first position, the audio cable line features a function of inputting audio signals from an audio device to a terminal device; when the switch module is located at a second position, the audio cable line features a function of outputting the audio signals from the terminal device to the audio device.

Furthermore, the first interface includes a LOUT/MICOUT port, a ROUT port and a first earthing port G2. The second interface includes a LIN port, a RIN port, a MIC port and a second earthing port G1. The switch module includes six pins of A, B, C, D, E and F, and a toggle switch. Two ends of a bottom part of the toggle switch are respectively provided with a first conducting plate and a second conducting plate. The first conducting plate is connected with the pin B all the time, and the second conducting plate is connected with the pin E all the time. The first conducting plate gets connected with the pins of A and B or the pins of B and C, and the second conducting plate gets connected with the pins of D and E or the pins of E and F. The pin A is connected to the LIN port, the pin B is connected to the LOUT/MICOUT port, the pin C is connected to the MIC port, the pin D is connected to the RIN port, the pin E is connected to the ROUT port, and the pin F is grounded.

Furthermore, the first interface is set as a Cannon X Series, Latch, Rubber (XLR) port, and the second interface is set as a Universal Serial Bus Type-C (TYPE-C) port.

Furthermore, the first interface is set as an XLR port, and the second interface is set as a Universal Serial Bus (USB) port.

Furthermore, the first interface is set as a 6.35 mm port, and the second interface is set as a TYPE-C port.

Furthermore, the first interface is set as a 6.35 mm port, and the second interface is set as a USB port.

Furthermore, the first interface is set as a RCA port, and the second interface is set as a USB port.

Furthermore, the first interface is set as a RCA port, and the second interface is set as a TYPE-C port.

Furthermore, the first interface is set as 3.5 mm, and the second interface is set as a TYPE-C port.

Furthermore, the first interface is set as 3.5 mm, and the second interface is set as a USB port.

Furthermore, the terminal device is a computer, a tablet computer or a mobile phone.

Furthermore, the audio device is a stereo, a mixer or a microphone.

Furthermore, the audio cable line is provided with more than two of the first interfaces.

The beneficial effects of the present invention are:

the present invention provides an audio cable with switchable transmission direction. The audio cable is provided with a switch module which controls the first interface and the second interface in different conduction states, thereby realizing the function of audio input or audio output. The user only needs to use one audio cable to be applicable to different usage scenarios, thereby saving costs and improving the user's usage experience.

Figure 1:
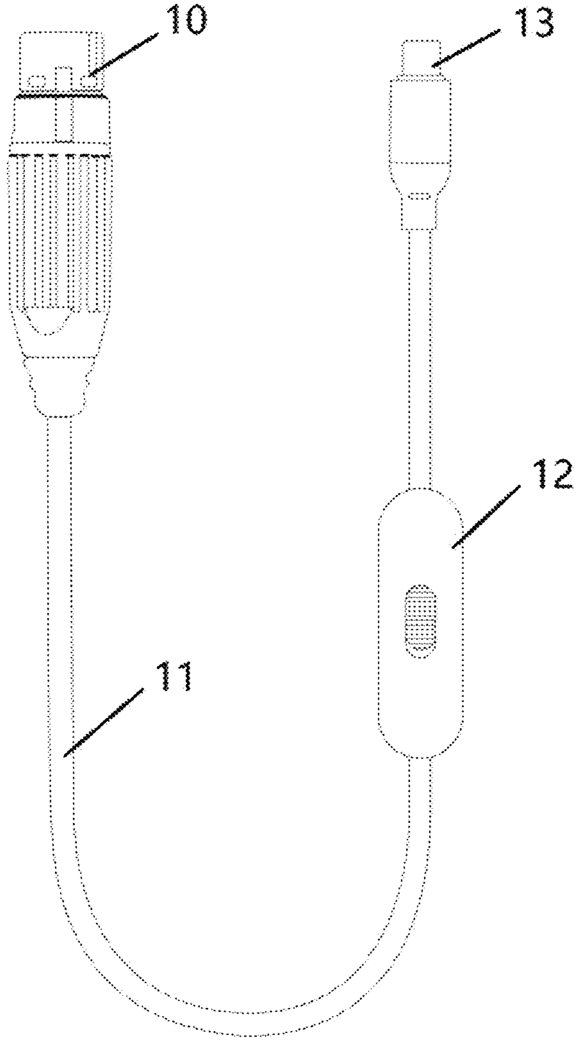
FIG. 1 is a schematic diagram of an audio cable in Embodiment 1 of the present invention.

Reference signs in the drawings: 10—first interface; 11—audio cable line; 12—switch module; 13—second interface.

DESCRIPTION OF EMBODIMENTS

The following will clearly and completely describe the concept, specific structure and technical effects of the present invention in combination with the embodiments and figures, so as to fully understand the purpose, characteristics and effects of the present invention. Obviously, the described embodiments are only part of the embodiments of the present invention, not all of them. Based on the embodiments of the present invention, other embodiments obtained by technicians in this field without creative work are all within the scope of protection of the present invention. In addition, all the connection relationships involved in the patent do not simply refer to the direct connection of components, but refer to the fact that a better connection structure can be formed by adding or reducing connection accessories according to the specific implementation situation. The various technical features in the present invention can be combined interchangeably without conflicting with each other.

The present invention provides an audio cable with switchable transmission direction. The audio cable is provided with a switch module, and make the first interface and the second interface in different conduction states by controlling the switch module, thereby realizing the function of audio input or audio output. The user only needs to use one audio cable to be applicable to different usage scenarios, thereby saving costs and improving the user's usage experience.

Embodiment 1

Figure 2:
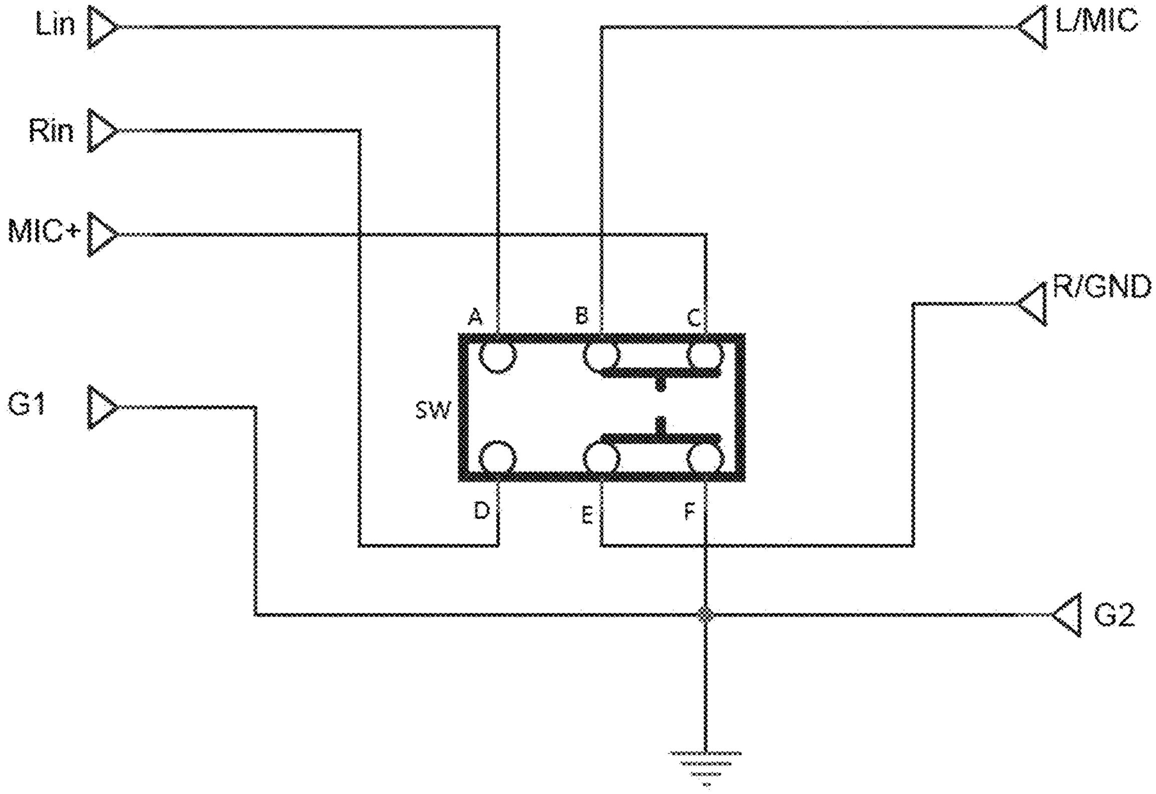
FIG. 2 is a circuit diagram of a switch module at the first position in Embodiment 1 thereof.
Figure 3:
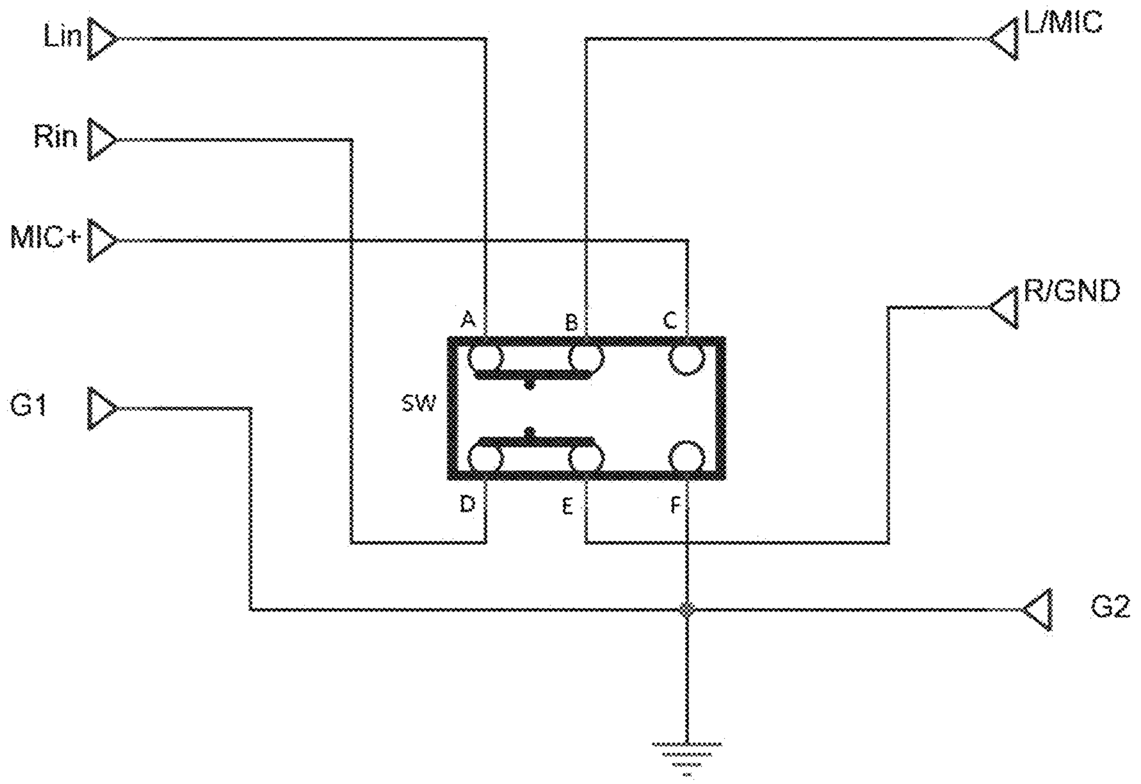
FIG. 3 is a circuit diagram of a switch module at the second position in Embodiment 1 thereof.

Referring to FIGS. 1 to 3, this embodiment provides an audio cable with switchable transmission direction, including an audio cable line 11. One end of the audio cable line 11 is provided with a first interface 10 for connecting with an audio device, and other end of the audio cable line 11 is provided with a second interface 13 for connecting with a terminal device. A switch module 12 is arranged at a middle part of the audio cable line. The switch module 12 is electrically connected with the first interface 10 and the second interface 13.

Preferably, the terminal device is a computer, a tablet computer or a mobile phone, and the audio device is a stereo, a mixer or a microphone.

Referring to FIG. 1, in this embodiment, the first interface 10 is set as an XLR port, which is used for connecting with a professional audio device such as a microphone, a mixer and a musical instrument. The second interface 13 is set as a TYPE-C port, which is used for connecting with a terminal device such as a computer, a tablet computer and a mobile phone.

Furthermore, the switch module 12 is capable of toggling between a first position and a second position. For the convenience of description, a microphone and a stereo are used as examples for explanation. When the switch module 12 is located at the first position, the first interface 10 is connected with the microphone, the second interface 13 is connected with the terminal device such as a computer, a mobile phone and a tablet computer, the audio cable line 11 is capable of inputting audio signals from the microphone to the terminal device; when the switch module 12 is located at the second position, the first interface 10 is connecting with the stereo, the second interface 13 is connecting with the terminal device such as a computer, a mobile phone and a tablet computer, the audio cable line 11 is cable of outputting the audio signals from the terminal device to the stereo.

That is, users only needs one audio cable to realize the functions of audio input and audio output, which has a wider range of usage scenarios and improves the user experience.

Specifically, the first interface 10 includes a LOUT/MICOUT port, a ROUT/GND port and a first earthing port G2. The LOUT/MICOUT port here refers to a shared port for left channel output port and the microphone input port. By the means of adjusting the position of the switch module 12, the LOUT/MICOUT port features a function of left channel output or a function of microphone input. The ROUT/GND port refers to a shared port for right channel output and earthing port. By the means of adjusting the position of the switch module 12, the ROUT/GND port features a function of right channel output or earthing.

The second interface 13 includes a LIN port, a RIN port, a MIC port and a second earthing port G1. The LIN port here refers to a left channel input port, the RIN refers to a right channel input port, and the MIX port refers to a microphone input port.

Referring to FIGS. 2 and 3, the switch module 12 includes six pins of A, B, C, D, E and F, and a toggle switch. Two ends of a bottom part of the toggle switch are respectively provided with a first conducting plate and a second conducting plate. The first conducting plate is connected with the pin B all the time, and the second conducting plate is connected with the pin E all the time. The first conducting plate gets connected with the pins of A and B or the pins of B and C, and the second conducting plate gets connected with the pins of D and E or the pins of E and F. The pin A is connected to the LIN port, the pin B is connected to the LOUT/MOCOUT port, the pin C is connected to the MIC port, the pin D is connected to the RIN port, the pin E is connected to the ROUT port, and the pin F is grounded.

It can be understood that, the first position mentioned above refers to the position of the toggle switch when the first conducting plate is connected to pins of B and C, and the second conducting plate is connected to the pins of E and F. At this time, the LOUT/MICOUT port features a function of microphone input. Correspondingly, the MICOUT port is connected with the MIC port, and the ROUT port is connected with the F pin and grounded, which can prevent the right channel input from interfering with the microphone signal. The audio cable in this state can be applied to scenarios requiring audio input, such as connecting a mobile phone with a microphone. The audio cable line 11 can input the audio signals from the microphone into the mobile phone to achieve the audio recording function.

The second position mentioned above refers to the position of the toggle switch when the first conducting plate is connected to pins of A and B, and the second conducting plate is connected to the pins of D and E. At this time, the LOUT/MICOUT port features a function of left channel output. Correspondingly, the LIN port is connected to the LOUT port, and the RIN port is connected to the ROUT port. The audio cable in this state can be applied to scenarios requiring audio output, such as connecting a mobile phone with a stereo. The audio cable line 11 can output the audio signals from the microphone to the stereo to achieve the audio playing function.

It should be noted that, the present invention uses a switch module to change the actual connection port of the circuit to achieve the purpose of changing the audio transmission direction. Therefore, no matter using a switch button or other methods, as long as the technical solution of switching the audio transmission direction is achieved by adjusting and changing the actual connection port of the circuit, it belongs to the scope of protection of the present invention.

Embodiment 2

Figure 4:
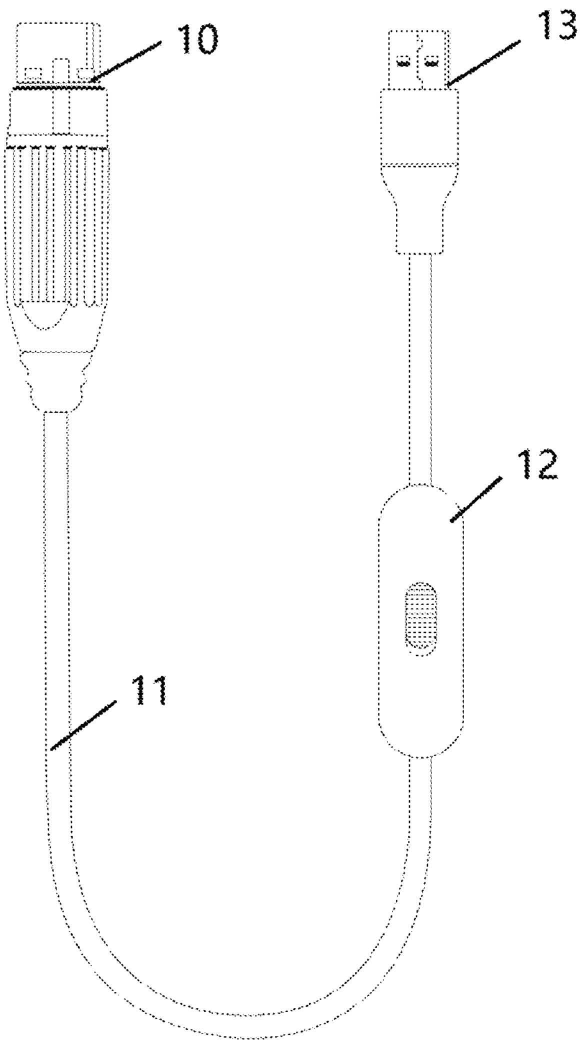
FIG. 4 is a schematic diagram of an audio cable line in Embodiment 2 thereof.

Referring to FIG. 4, the difference between Embodiment 2 and Embodiment 1 is that the second interface 13 is set as a USB interface. The audio cable provided in Embodiment 2 is suitable for a terminal device with a USB interface such as a computer, which can provide a wider range of application scenarios and improve the usage experience for users.

Embodiment 3

Figure 5:
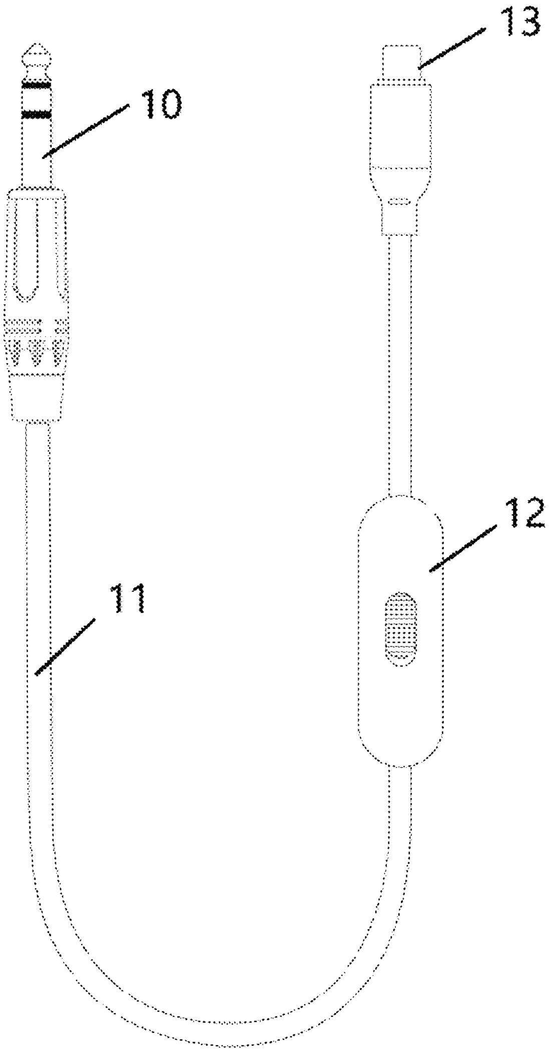
FIG. 5 is a schematic diagram of an audio cable line in Embodiment 3 thereof.

Referring to FIG. 5, the difference between Embodiment 3 and Embodiment 1 is that the first interface 10 is set as a 6.35 mm interface which can be used for connecting with high fidelity audio devices such as professional audio devices, audio amplifiers, electronic musical instruments and large headphones, to meet the needs of users with high requirements for sound quality.

The second interface 13 is still set as a TYPE-C interface, which allows the audio cable to be easily connected to a terminal device such as a mobile phone or a computer. This brings convenience to users in different scenarios, and users can flexibly connect the audio device to the terminal device according to specific needs.

The audio cable provided in Embodiment 3 expands the application scope of the audio cable, allowing users to transmit and switch audio signals among more devices. No matter the user is a professional music producer or an ordinary consumer, he/she can easily select a suitable audio device for connection according to actual conditions and enjoy a high-quality audio experience.

Embodiment 4

Figure 6:
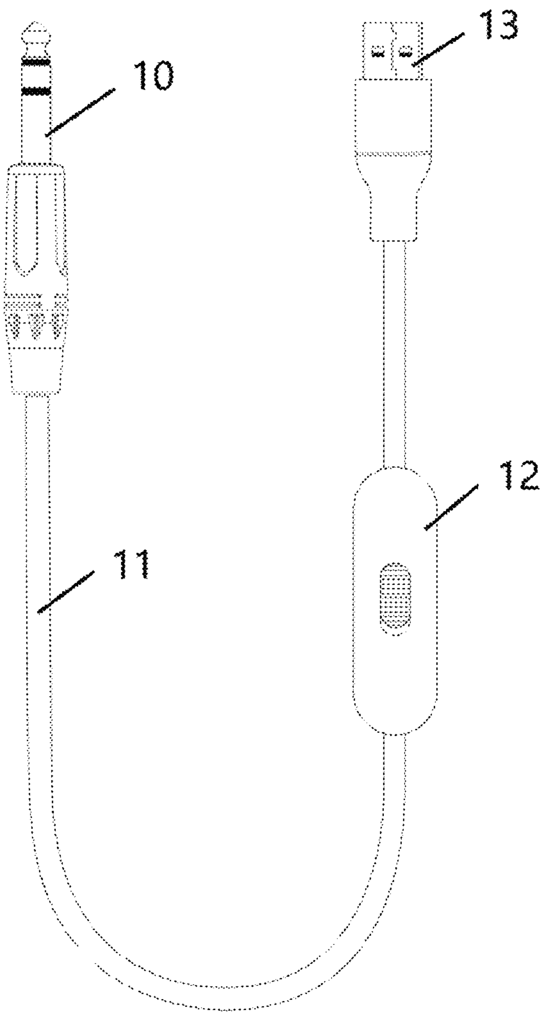
FIG. 6 is a schematic diagram of an audio cable line in Embodiment 4 thereof.

Referring to FIG. 6, the difference between Embodiment 4 and Embodiment 3 is that the second interface 13 is set as a USB port, which increases the compatibility and versatility of the audio cable in Embodiment 4, making it more convenient for users to transmit and switch audio on different devices.

Embodiment 5

Figure 7:
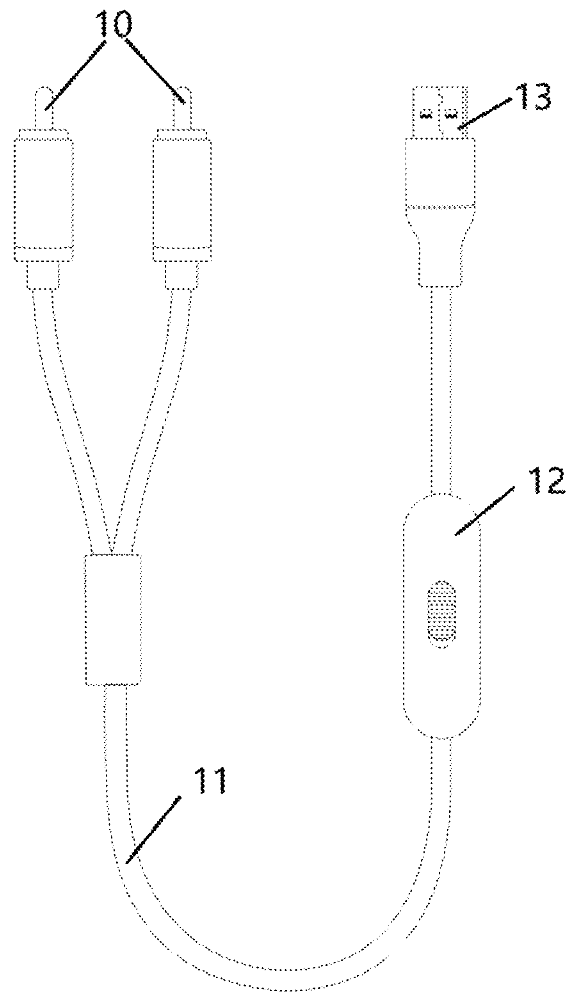
FIG. 7 is a schematic diagram of an audio cable line in Embodiment 5 thereof.

Referring to FIG. 7, the difference of Embodiment 5 and Embodiment 1 is that the audio cable line is provided with more than two of the first interfaces 10.

Specifically, the first interface 10 is set as a RCA port, and the RCA port is provided with two.

In actual use, users select audio cables with different numbers of RCA interfaces according to their usage scenarios.

The RCA interface is a common audio interface, which is usually used for connecting devices such as stereo system and TV. By the means of setting one end of the audio cable as a RCA port, users can conveniently connect the audio cable with these devices to achieve the transmission of audio signals. And the second interface 13 is set as a USB port, which can be widely applied for the terminal devices such as mobile phone and computer, which is more convenient for users to transmit and switch the audio among different devices, and increases the practicality and versatility of the audio cable. No matter it is home entertainment or professional audio production, the audio cable provided in Embodiment 5 meets needs of users.

Embodiment 6

Figure 8:
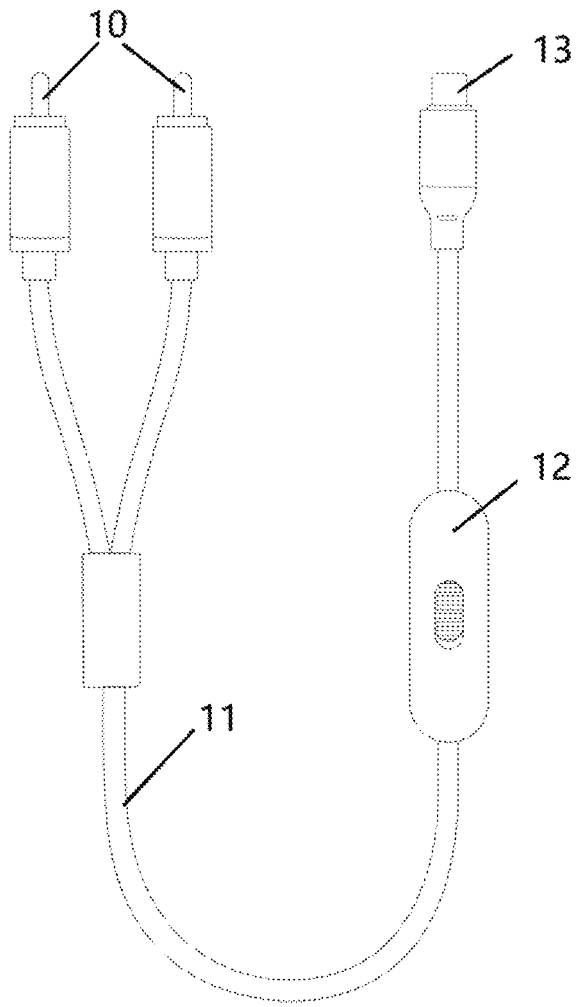
FIG. 8 is a schematic diagram of an audio cable line in Embodiment 6 thereof.

Referring to FIG. 8, the difference between Embodiment 6 and Embodiment 5 is that, the second interface 13 is set as a TYPE-C port. The remaining features and advantages of Embodiment 6 are the same as those of Embodiment 5.

Embodiment 7

Figure 9:
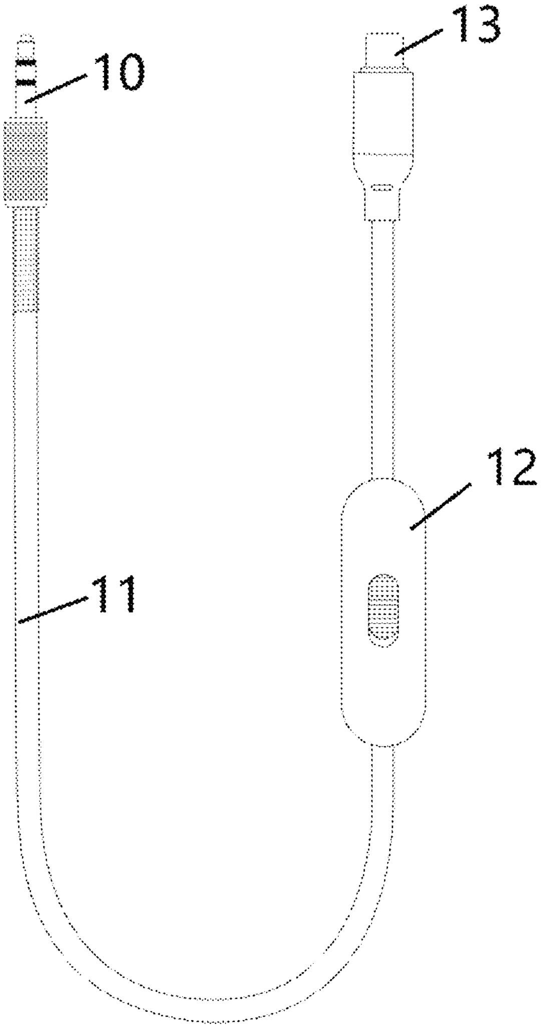
FIG. 9 is a schematic diagram of an audio cable line in Embodiment 7 thereof.

Referring to FIG. 9, the difference between Embodiment 7 and Embodiment 1 is that, the first interface 10 is set as 3.5 mm, which can be used for connecting with headphones, speakers, mobile phones, MP3 players, etc. It is suitable for short-distance audio transmission scenarios. The second interface 13 is still set as a TYPE-C interface.

The remaining features and advantages of Embodiment 7 are the same as those of Embodiment 1.

Embodiment 8

Figure 10:
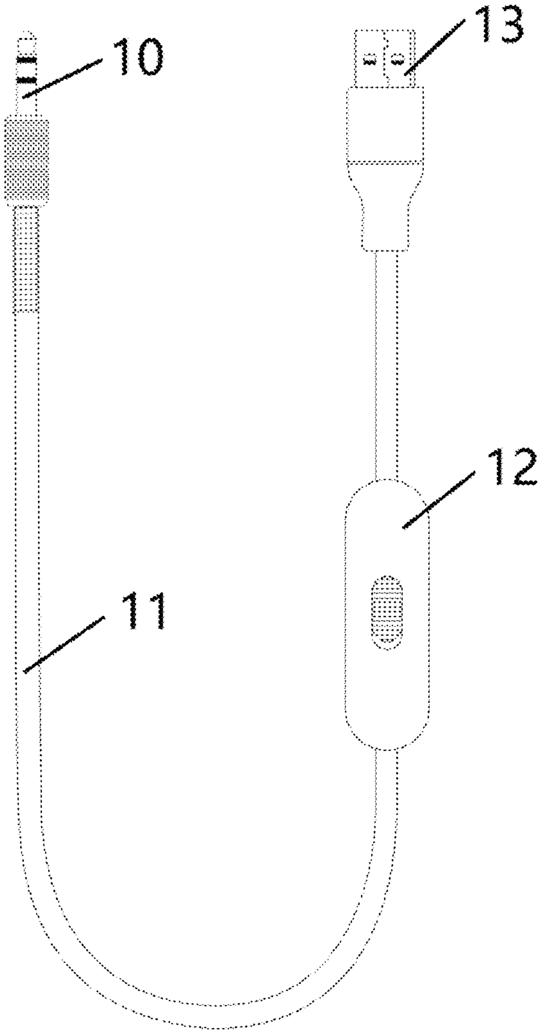
FIG. 10 is a schematic diagram of an audio cable line in Embodiment 8 thereof.

Referring to FIG. 10, the difference between Embodiment 8 and Embodiment 7 is that, the second interface 13 is set as a USB interface.

The remaining features and advantages of Embodiment 8 are the same as those of Embodiment 7.

In summary, the present invention provides an audio cable with switchable transmission direction, whose interfaces have a variety of combination forms and strong compatibility. Users only need to use one audio cable to adapt to different usage scenarios, which saves costs and improves the usage experience for users.

It can be understood that those skilled in the art can, under the guidance of the above embodiments, combine various implementation methods in the above embodiments to obtain technical solutions of multiple implementation methods.

The above description is only preferred embodiments of the present invention and is not intended to limit the present invention. Any modifications, equivalent substitutions and improvements made within the spirit and principles of the present invention should be involved in the protection scope of the present invention.

What is claimed is:

1. An audio cable with switchable transmission direction, comprises an audio cable line, wherein one end of the audio cable line is provided with a first interface for connecting with an audio device, and other end of the audio cable line is provided with a second interface for connecting with a terminal device; a switch module is arranged at a middle part of the audio cable line, the switch module is electrically connected with the first interface and the second interface; when the switch module is located at a first position, the audio cable line features a function of inputting audio signals from the audio device to the terminal device; when the switch module is located at a second position, the audio cable line features a function of outputting the audio signals from the terminal device to the audio device.

2. The audio cable with switchable transmission direction according to claim 1, wherein the first interface comprises a LOUT/MICOUT port, a ROUT port and a first earthing port G2, the second interface comprises a LIN port, a RIN port, a MIC port and a second earthing port G1; the switch module further comprises six pins of A, B, C, D, E, and F, and a toggle switch; two ends of a bottom part of the toggle switch are respectively provided with a first conducting plate and a second conducting plate, the first conducting plate is connected with the pin B all the time, the second conducting plate is connected with the pin E all the time; the first conducting plate gets connected with the pins of A and B or the pins of B and C, the second conducting plate gets connected with the pins of D and E or the pins of E and F; the pin A is connected to the LIN port, the pin B is connected to the LOUT/MICOUT port, the pin C is connected to the MIC port, the pin D is connected to the RIN port, the pin E is connected to the ROUT port, and the pin F is grounded.

3. The audio cable with switchable transmission direction according to claim 1, wherein the first interface is set as a Cannon X Series, Latch, Rubber (XLR) port, and the second interface is set as a Universal Serial Bus Type-C (TYPE-C) port.

4. The audio cable with switchable transmission direction according to claim 1, wherein the first interface is set as an XLR port, and the second interface is set as a Universal Serial Bus (USB) port.

5. The audio cable with switchable transmission direction according to claim 1, wherein the first interface is set as a 6.35 mm port, and the second interface is set as a TYPE-C port.

6. The audio cable with switchable transmission direction according to claim 1, wherein the first interface is set as a 6.35 mm port, and the second interface is set as a USB port.

7. The audio cable with switchable transmission direction according to claim 1, wherein the first interface is set as a RCA port, and the second interface is set as a USB port.

8. The audio cable with switchable transmission direction according to claim 1, wherein the first interface is set as a RCA port, and the second interface is set as a TYPE-C port.

9. The audio cable with switchable transmission direction according to claim 1, wherein the first interface is set as 3.5 mm, and the second interface is set as a TYPE-C port.

10. The audio cable with switchable transmission direction according to claim 1, wherein the first interface is set as 3.5 mm, and the second interface is set as a USB port.

11. The audio cable with switchable transmission direction according to claim 1, wherein the terminal device is a computer, a tablet computer or a mobile phone.

12. The audio cable with switchable transmission direction according to claim 1, wherein the audio device is a stereo, a mixer or a microphone.

13. The audio cable with switchable transmission direction according to claim 1, wherein the audio cable line is provided with more than two of the first interfaces.

* * * * *